(12) United States Patent
Lu et al.

(10) Patent No.: US 10,693,858 B2
(45) Date of Patent: Jun. 23, 2020

(54) CDN-BASED ACCESS CONTROL METHOD AND RELATED DEVICE

(71) Applicant: Huawei Technologies Co., Ltd., Shenzhen (CN)

(72) Inventors: Dajun Lu, Nanjing (CN); Weiming Cheng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 15/824,499

(22) Filed: Nov. 28, 2017

(65) Prior Publication Data

US 2018/0091495 A1    Mar. 29, 2018

Related U.S. Application Data

(63) Continuation of application No. PCT/CN2016/074771, filed on Feb. 27, 2016.

(30) Foreign Application Priority Data

Jul. 31, 2015  (CN) .......................... 2015 1 0466027

(51) Int. Cl.
*H04L 29/06* (2006.01)
*G06F 16/14* (2019.01)
(Continued)

(52) U.S. Cl.
CPC ........ *H04L 63/0807* (2013.01); *G06F 16/137* (2019.01); *G06F 16/152* (2019.01);
(Continued)

(58) Field of Classification Search
CPC .. H04N 21/20; G06Q 20/1235; G06F 16/137; G06F 16/152
See application file for complete search history.

(56) References Cited

U.S. PATENT DOCUMENTS

2009/0259853 A1    10/2009 Swildens et al.
2010/0306257 A1*   12/2010 Levy ...................... G06F 21/10
                                                          707/770
(Continued)

FOREIGN PATENT DOCUMENTS

CN    102130935 A    7/2011
CN    102571936 A    7/2012
(Continued)

OTHER PUBLICATIONS

Machine Translation and Abstract of Chinese Publication No. CN102571936, Jul. 11, 2012, 24 pages.
(Continued)

*Primary Examiner* — Thaddeus J Plecha
(74) *Attorney, Agent, or Firm* — Conley Rose, P.C.

(57) ABSTRACT

A content delivery network based (CDN-based) access control method, includes receiving, by a CDN server, a hypertext transfer protocol (HTTP) request from a user terminal and identification information of the user terminal, where the HTTP request includes an access ticket, sending the identification information of the user terminal and the HTTP request to a service server, receiving an HTTP response including a content fingerprint when an authentication result indicating that the access ticket is valid, obtaining the content resource according to the content fingerprint, and sending the content resource to the user terminal.

20 Claims, 11 Drawing Sheets

(51) Int. Cl.
*G06F 16/13* (2019.01)
*G06F 21/60* (2013.01)
*G06F 21/62* (2013.01)
*H04L 9/32* (2006.01)
H04L 29/08 (2006.01)
H04N 21/20 (2011.01)
G06Q 20/12 (2012.01)
G06F 21/10 (2013.01)

(52) U.S. Cl.
CPC ............ *G06F 21/604* (2013.01); *G06F 21/62* (2013.01); *H04L 9/3247* (2013.01); *H04L 29/06* (2013.01); *H04L 63/08* (2013.01); *G06F 21/10* (2013.01); *G06Q 20/1235* (2013.01); H04L 29/08 (2013.01); H04L 63/10 (2013.01); H04L 67/02 (2013.01); H04N 21/20 (2013.01)

(56) References Cited

U.S. PATENT DOCUMENTS

| | | | |
|---|---|---|---|
| 2012/0144195 A1* | 6/2012 | Nair | H04L 63/0428 713/168 |
| 2013/0055399 A1 | 2/2013 | Zaitsev | |
| 2013/0151663 A1 | 6/2013 | He et al. | |
| 2013/0202150 A1 | 8/2013 | Sinha et al. | |
| 2013/0290465 A1* | 10/2013 | Harrison | H04L 67/04 709/213 |
| 2014/0279851 A1* | 9/2014 | Rangarajan | H04L 67/04 707/609 |
| 2014/0282689 A1* | 9/2014 | Kummer | H04N 21/2393 725/31 |
| 2015/0052584 A1* | 2/2015 | Rudraraju | H04L 63/102 726/4 |
| 2015/0237159 A1* | 8/2015 | Lawrence | H04L 67/2814 709/213 |
| 2016/0026825 A1 | 1/2016 | Patey et al. | |
| 2016/0379599 A1* | 12/2016 | Yeung | G09G 5/14 345/520 |

FOREIGN PATENT DOCUMENTS

| | | |
|---|---|---|
| CN | 102611713 A | 7/2012 |
| CN | 102932323 A | 2/2013 |
| CN | 103109511 A | 5/2013 |
| CN | 103607416 A | 2/2014 |
| WO | 2011126481 A1 | 10/2011 |
| WO | 2012152813 A1 | 11/2012 |
| WO | 2014140008 A1 | 9/2014 |

OTHER PUBLICATIONS

Foreign Communication From a Counterpart Application, PCT Application No. PCT/CN2016/074771, English Translation of International Search Report dated May 4, 2016, 3 pages.

Machine Translation and Abstract of Chinese Publication No. CN102611713, Jul. 25, 2012, 19 pages.

Machine Translation and Abstract of Chinese Publication No. CN103607416, Feb. 26, 2014, 55 pages.

Foreign Communication From a Counterpart Application, Chinese Application No. 201510466027.4, Chinese Office Action dated Nov. 26, 2018, 9 pages.

Leung, K., et al., "URI Signing for CDN Interconnection (CDNI) draft-ietf-cdni-uri-signing-04," XP015106439, Jun. 1, 2015, 55 pages.

Foreign Communication From a Counterpart Application, European Application No. 16832074.5, Extended European Search Report dated Feb. 15, 2018, 6 pages.

* cited by examiner

CDN-BASED ACCESS CONTROL METHOD AND RELATED DEVICE

CROSS-REFERENCE TO RELATED APPLICATIONS

This application is a continuation of International Patent Application No. PCT/CN2016/074771 filed on Feb. 27, 2016, which claims priority to Chinese Patent Application No. 201510466027.4 filed on Jul. 31, 2015. The disclosures of the aforementioned applications are hereby incorporated by reference in their entireties.

TECHNICAL FIELD

The present disclosure relates to the field of network technologies, and in particular, to a content delivery network based (CDN-based) access control method and a related device.

BACKGROUND

A CDN is a layer of an intelligent virtual network that includes node servers disposed throughout a network and that is based on the existing Internet. According to comprehensive information such as network traffic, a connection and a load status of each node, a distance between each node and a user, and a response time, the CDN may redirect in real time a user's request to a serving node closest to the user such that a node closer to a user is selected to send content required by the user to the user, a network congestion status is mitigated, and a response speed of a website is improved.

A CDN-based access control method provided in the other approaches is as follows.

When a user accesses a content resource of a service server using a user agent (such as, a browser, a download tool, or a streaming media player), the service server generates a uniform resource locator (URL) according to an algorithm and a key provided by a CDN server. The URL points to a content resource in the CDN server, the user accesses the content resource in the CDN server using the URL, and the CDN server sends a content resource requested by the user to the user.

However, if an intruder cracks the URL obtained using the user agent, the intruder may obtain an actual address of the content resource. The intruder may bypass the service server and obtain the content resource using the actual address. Therefore, there is a risk in a content resource stored in the CDN server.

SUMMARY

Embodiments of the present disclosure provide a CDN-based access control method, a CDN server, and a service server in order to improve security of a content resource stored in a CDN server.

A first aspect of embodiments of the present disclosure provides a CDN-based access control method, including receiving, by a CDN server, a hypertext transfer protocol (HTTP) request sent by a user terminal and identification information of the user terminal, where the HTTP request includes an access ticket, and the access ticket is used to identify a user access permission, sending, by the CDN server, the identification information of the user terminal and the HTTP request to a service server such that the service server performs authentication on the access ticket using the identification information of the user terminal, receiving, by the CDN server, an HTTP response that includes a content fingerprint and that is returned by the service server if an authentication result is that the access ticket is valid, where the content fingerprint is used to identify a content resource, obtaining, by the CDN server, the content resource according to the content fingerprint, and sending the content resource to the user terminal.

With reference to the first aspect of the embodiments of the present disclosure, in a first implementation manner of the first aspect of the embodiments of the present disclosure, before receiving, by a CDN server, an HTTP request sent by a user terminal and identification information of the user terminal, the method includes receiving, by the CDN server, the content fingerprint that is sent by the service server and the content resource, and checking, by the CDN server, whether the CDN server has stored the content fingerprint or the content resource, saving the content fingerprint and the content resource if the CDN server does not store the content fingerprint or the content resource, or discarding the content fingerprint and the content resource if the CDN server has stored the content fingerprint or the content resource.

With reference to the first aspect of the present disclosure, in a second implementation manner of the first aspect of the present disclosure, after sending, by the CDN server, the content resource to the user terminal, the method includes obtaining, by the CDN server, an updated content resource and an updated content fingerprint from the service server if a quantity of times the content resource is accessed in a preset period of time is not greater than a preset threshold.

A second aspect of embodiments of the present disclosure provides a CDN-based access control method, including receiving, by a service server, an HTTP request and identification information of a user terminal that are sent by a CDN server, where the HTTP request includes an access ticket, and the access ticket is used to identify a user access permission, performing, by the service server, authentication on the access ticket using the identification information of the user terminal, and returning, by the service server, an HTTP response including a content fingerprint to the CDN server if an authentication result is that the access ticket is valid such that the CDN server obtains a content resource according to the content fingerprint.

With reference to the second aspect of the embodiments of the present disclosure, in a first implementation manner of the second aspect of the embodiments of the present disclosure, before returning, by the service server, an HTTP response including a content fingerprint to the CDN server, the method includes performing, by the service server, a hash operation on the content resource to obtain the content fingerprint, and sending, by the service server, the content resource and the content fingerprint to the CDN server.

With reference to the second aspect of the embodiments of the present disclosure, in a second implementation manner of the second aspect of the embodiments of the present disclosure, after the returning, by the service server, an HTTP response including the content fingerprint to the CDN server, the method includes receiving, by the service server, a content update request that includes a URL and that is sent by the CDN server, searching, by the service server, for the content resource and the content fingerprint according to the URL, and returning, by the service server, the content resource and the content fingerprint corresponding to the URL to the CDN server.

A third aspect of embodiments of the present disclosure provides a CDN-based access control method, including receiving, by a service server, an HTTP request sent by a user terminal, where the HTTP request is used to obtain a content resource, generating, by the service server, a URL according to the HTTP request, where the URL includes a content fingerprint corresponding to the content resource, and returning, by the service server, the URL to the user terminal such that the user terminal sends an HTTP request including the URL to a CDN server.

A fourth aspect of embodiments of the present disclosure provides a CDN-based access control method, including receiving, by a CDN server, an HTTP request sent by a user terminal, where the HTTP request includes a content fingerprint, obtaining, by the CDN server, a corresponding content resource according to the content fingerprint, and sending, by the CDN server, the content resource to the user terminal.

A fifth aspect of embodiments of the present disclosure provides a CDN-based access control method, including sending, by a user terminal, an HTTP request to a service server, where the HTTP request is used to obtain a content resource, receiving, by the user terminal, a URL returned by the service server, where the URL includes a content fingerprint corresponding to the content resource, sending, by the user terminal, an HTTP request to a CDN server, where the HTTP request includes the content fingerprint such that the CDN server obtains the corresponding content resource according to the content fingerprint, and receiving, by the user terminal, the content resource returned by the CDN server.

A sixth aspect of embodiments of the present disclosure provides a CDN server, including a receiving module configured to receive an HTTP request sent by a user terminal and identification information of the user terminal, where the HTTP request includes an access ticket, and the access ticket is used to identify a user access permission, a sending module configured to send the identification information of the user terminal and the HTTP request to a service server such that the service server performs authentication on the access ticket using the identification information of the user terminal, where the receiving module is further configured to receive an HTTP response that includes a content fingerprint and that is returned by the service server if an authentication result is that the access ticket is valid, where the content fingerprint is used to identify a content resource, and an obtaining module configured to obtain the content resource according to the content fingerprint and then send the content resource to the user terminal.

With reference to the sixth aspect of the embodiments of the present disclosure, in a first implementation manner of the sixth aspect of the embodiments of the present disclosure, the receiving module is further configured to receive the content fingerprint and the content resource that are sent by the service server fingerprint that is sent by the service server and the content resource. The CDN server further includes a checking module configured to check whether the CDN server has stored the content fingerprint, trigger a step in which a saving module saves the content fingerprint and the content resource if the CDN server does not store the content fingerprint, or trigger an execution module to discard the content fingerprint and the content resource if the CDN server has stored the content fingerprint. The saving module configured to save the content fingerprint and the content resource, and the execution module configured to discard the content fingerprint and the content resource.

With reference to the sixth aspect of the embodiments of the present disclosure, in a second implementation manner of the sixth aspect of the embodiments of the present disclosure, the obtaining module is further configured to obtain an updated content resource and an updated content fingerprint from the service server if a quantity of times the content resource is accessed in a preset period of time is not greater than a preset threshold.

A seventh aspect of embodiments of the present disclosure provides a service server, including a receiving module configured to receive an HTTP request and identification information of a user terminal that are sent by a CDN server, where the HTTP request includes the access ticket, an authentication module configured to perform authentication on the access ticket using the identification information of the user terminal, and a sending module configured to return an HTTP response including a content fingerprint to the CDN server if an authentication result is that the access ticket is valid such that the CDN server obtains a content resource according to the content fingerprint.

With reference to the seventh aspect of the embodiments of the present disclosure, in a first implementation manner of the seventh aspect of the embodiments of the present disclosure, the service server further includes an operation module configured to perform a hash operation on the content resource to obtain the content fingerprint, where the content fingerprint is used to identify the content resource, and the sending module is further configured to send the content resource and the content fingerprint to the CDN server.

With reference to the seventh aspect of the embodiments of the present disclosure, in a second implementation manner of the seventh aspect of the embodiments of the present disclosure, the receiving module is further configured to receive a content update request that includes a URL and that is sent by the CDN server. The service server further includes a searching module configured to search for the content resource and the content fingerprint according to the URL, and the sending module is further configured to return the content resource and the content fingerprint corresponding to the URL to the CDN server.

An eighth aspect of embodiments of the present disclosure provides a service server, including a receiving module configured to receive an HTTP request sent by a user terminal, where the HTTP request is used to obtain a content resource, a generation module configured to generate a URL according to the HTTP request, where the URL includes a content fingerprint corresponding to the content resource, and a sending module configured to return the URL to the user terminal such that the user terminal sends an HTTP request including the URL to a CDN server.

A ninth aspect of embodiments of the present disclosure provides a CDN server, including a receiving module configured to receive an HTTP request sent by a user terminal, where the HTTP request includes a content fingerprint, an obtaining module configured to obtain a corresponding content resource according to the content fingerprint, and a sending module configured to send the content resource to the user terminal.

A tenth aspect of embodiments of the present disclosure provides a user terminal, including a sending module configured to send an HTTP request to a service server, where the HTTP request is used to obtain a content resource, and a receiving module configured to receive a URL returned by the service server, where the URL includes a content fingerprint corresponding to the content resource, where the sending module is further configured to send an HTTP request to a CDN server, where the HTTP request includes the content fingerprint, and the receiving module receives the content resource returned by the CDN server.

An eleventh aspect of embodiments of the present disclosure provides a CDN server, including a receiving apparatus configured to receive an HTTP request sent by a user terminal and identification information of the user terminal, where the HTTP request includes an access ticket, and the access ticket is used to identify a user access permission, a sending apparatus configured to send the identification information of the user terminal and the HTTP request to a service server such that the service server performs authentication on the access ticket using the identification information of the user terminal, where the receiving apparatus is configured to receive an HTTP response that includes a content fingerprint and that is returned by the service server if an authentication result is that the access ticket is valid, where the content fingerprint is used to identify a content resource, and a processor configured to obtain the content resource according to the content fingerprint and then send the content resource to the user terminal.

With reference to the eleventh aspect of the embodiments of the present disclosure, in a first implementation manner of the eleventh aspect of the embodiments of the present disclosure, the receiving apparatus is further configured to receive the content fingerprint that is sent by the service server and the content resource, and the processor is further configured to check whether the processor has stored the content fingerprint, save the content fingerprint and the content resource if the processor does not store the content fingerprint, or discard the content fingerprint and the content resource if the processor has stored the content fingerprint.

With reference to the eleventh aspect of the embodiments of the present disclosure, in a second implementation manner of the eleventh aspect of the embodiments of the present disclosure, the processor is further configured to obtain an updated content resource and an updated content fingerprint from the service server if a quantity of times the content resource is accessed in a preset period of time is not greater than a preset threshold.

A twelfth aspect of embodiments of the present disclosure provides a service server, including a receiving apparatus configured to receive an HTTP request and identification information of a user terminal that are sent by a CDN server, where the HTTP request includes an access ticket, a processor configured to perform authentication on the access ticket using the identification information of the user terminal, and a sending apparatus configured to return an HTTP response including a content fingerprint to the CDN server if an authentication result is that the access ticket is valid such that the CDN server obtains a content resource according to the content fingerprint.

With reference to the twelfth aspect of the embodiments of the present disclosure, in a first implementation manner of the twelfth aspect of the embodiments of the present disclosure, the processor is further configured to perform a hash operation on the content resource to obtain the content fingerprint, where the content fingerprint is used to identify the content resource, and the sending apparatus is configured to send the content resource and the content fingerprint to the CDN server.

With reference to the twelfth aspect of the embodiments of the present disclosure, in a second implementation manner of the twelfth aspect of the embodiments of the present disclosure, the receiving apparatus is further configured to receive a content update request that includes a URL and that is sent by the CDN server. The processor is further configured to search for the content resource and the content fingerprint according to the URL, and the sending apparatus is further configured to return the content resource and the content fingerprint corresponding to the URL to the CDN server.

A thirteenth aspect of embodiments of the present disclosure provides a service server, including a receiving apparatus configured to receive an HTTP request sent by a user terminal, where the HTTP request is used to obtain a content resource, a processor configured to generate a URL according to the HTTP request, where the URL includes a content fingerprint corresponding to the content resource, and a sending apparatus configured to return the URL to the user terminal such that the user terminal sends an HTTP request including the URL to a CDN server.

A fourteenth aspect of embodiments of the present disclosure provides a CDN server, including a receiving apparatus configured to receive an HTTP request sent by a user terminal, where the HTTP request includes a content fingerprint, a processor configured to obtain a corresponding content resource according to the content fingerprint, and a sending apparatus configured to send the content resource to the user terminal.

A fifteenth aspect of embodiments of the present disclosure provides a user terminal, including a sending apparatus configured to send an HTTP request to a service server, where the HTTP request is used to obtain a content resource, and a receiving apparatus configured to receive a URL returned by the service server, where the URL includes a content fingerprint corresponding to the content resource, where the sending apparatus is further configured to send the HTTP request to a CDN server, where the HTTP request includes the content fingerprint such that the CDN server obtains the corresponding content resource according to the content fingerprint, and the receiving apparatus is further configured to receive the content resource returned by the CDN server.

It can be learned from the foregoing technical solutions that the embodiments of the present disclosure have the following advantages.

In the embodiments of the present disclosure, a CDN server receives an HTTP request sent by a user terminal and identification information of the user terminal, where the HTTP request includes an access ticket, and the access ticket is used to identify a user access permission, sends the identification information of the user terminal and the HTTP request to a service server such that the service server performs authentication on the access ticket using the identification information of the user terminal, receives an HTTP response that includes a content fingerprint and that is returned by the service server if an authentication result is that the access ticket is valid, where the content fingerprint is used to identify a content resource, and sends the content resource to the user terminal after obtaining the content resource according to the content fingerprint. The CDN server does not directly return the content resource to the user terminal according to the HTTP request, but searches for and returns the content resource according to the content fingerprint after receiving a result indicating that authentication performed by the service server on the HTTP request succeeds. The content fingerprint is stored by the service server and the CDN server, and is not passed through the user terminal. An intruder cannot obtain the content fingerprint using the user terminal, and cannot obtain the content resource without the content fingerprint. Therefore, security of the content resource is improved.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons skilled in the art based on the embodiments of the present disclosure without creative efforts shall fall within the protection scope of the present disclosure.

In the embodiments of the present disclosure, a network architecture to which a CDN-based access control method may be applied includes a service server configured to perform authentication on a user, provide a CDN server with a content resource, and provide the user with an address of the content resource in the CDN server after receiving a content request sent by a user terminal. The CDN server configured to store the content resource provided by the service server, and return the content resource to the user terminal after receiving the content request sent by the user terminal, and the user terminal configured to initiate an HTTP request and obtain the content resource.

Figure 1:
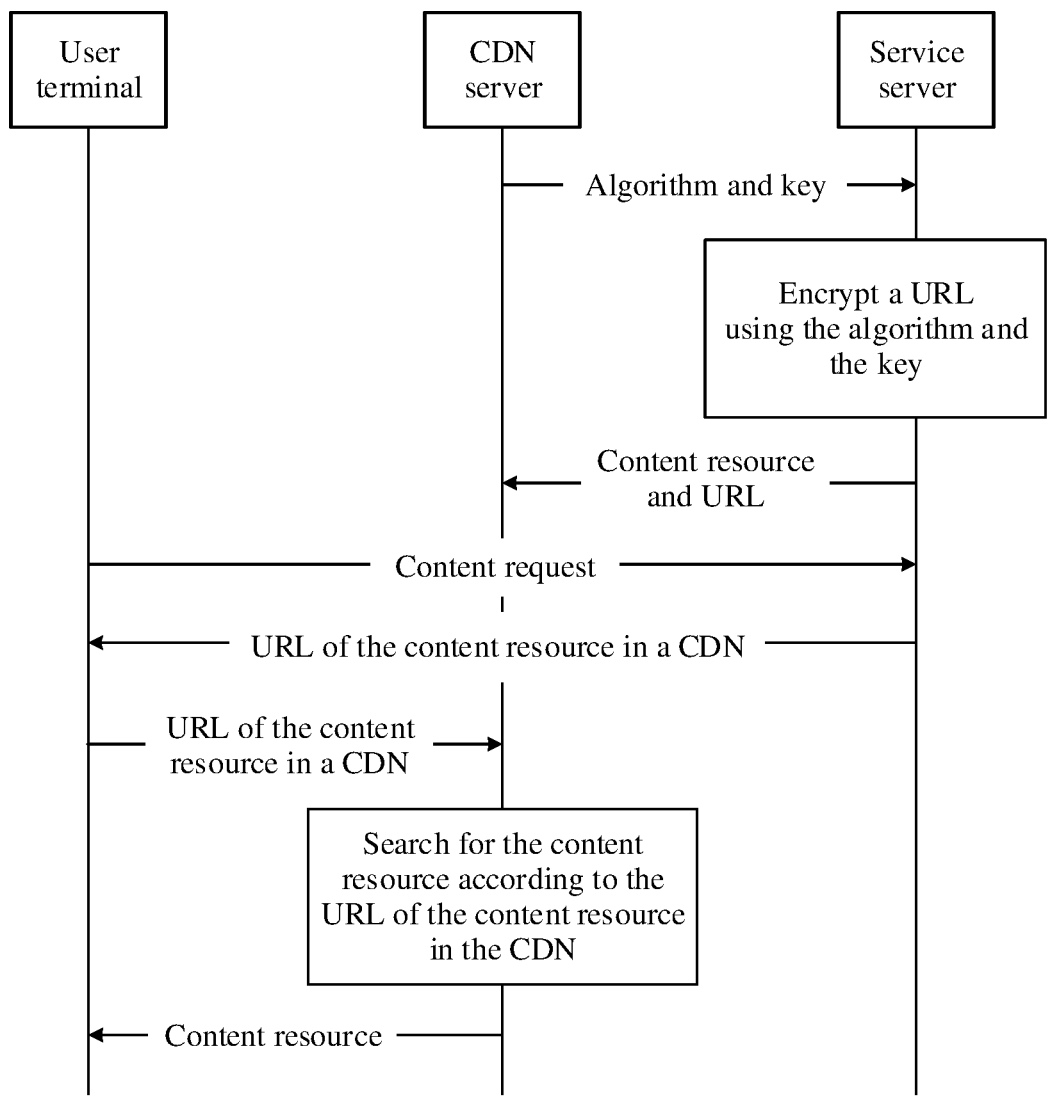
FIG. 1 is a schematic signaling flowchart of a CDN-based access control method.

Referring to FIG. 1, based on the foregoing network architecture, an embodiment of a CDN-based access control method includes the following.

A CDN server provides a service server with an encryption algorithm and a decryption algorithm and a key, and the service server encrypts a URL according to the encryption algorithm and the decryption algorithm and the key.

When a user terminal accesses a content resource in the service server, the service server generates an HTTP response corresponding to the content resource. The HTTP response includes an Internet Protocol (IP) address of the user terminal, a time of sending a content request, and a URL. The user terminal sends a content request packet to a CDN server specified by the URL. After user information is authenticated by the CDN server, the CDN server obtains the content resource according to the URL. If there is no content resource in the CDN server, the CDN server sends the content request packet from the user terminal to the service server. After finding the content resource according to the content request packet, the service server sends the content resource to the CDN server, and the CDN server returns the content resource to the user terminal and saves the content resource. It should be understood that interaction between the user terminal and a server side is implemented using a user agent (such as, a browser, a download tool, or a streaming media player). Reference may be made to the other approaches and details are not described herein.

In the other approaches, the service server sends a URL of the content resource in the CDN server to a user. Although the URL is encrypted, an intruder may obtain the URL and access the CDN server, and the CDN server cannot perform authentication on the user, therefore, there is a risk.

In addition, when allocating the content resource to the CDN server, the service server allocates a URL to the content resource. The CDN server identifies the content resource using the URL. Because content stored by different users corresponds to different URLs, the CDN server stores many content resources with same content.

Figure 2:
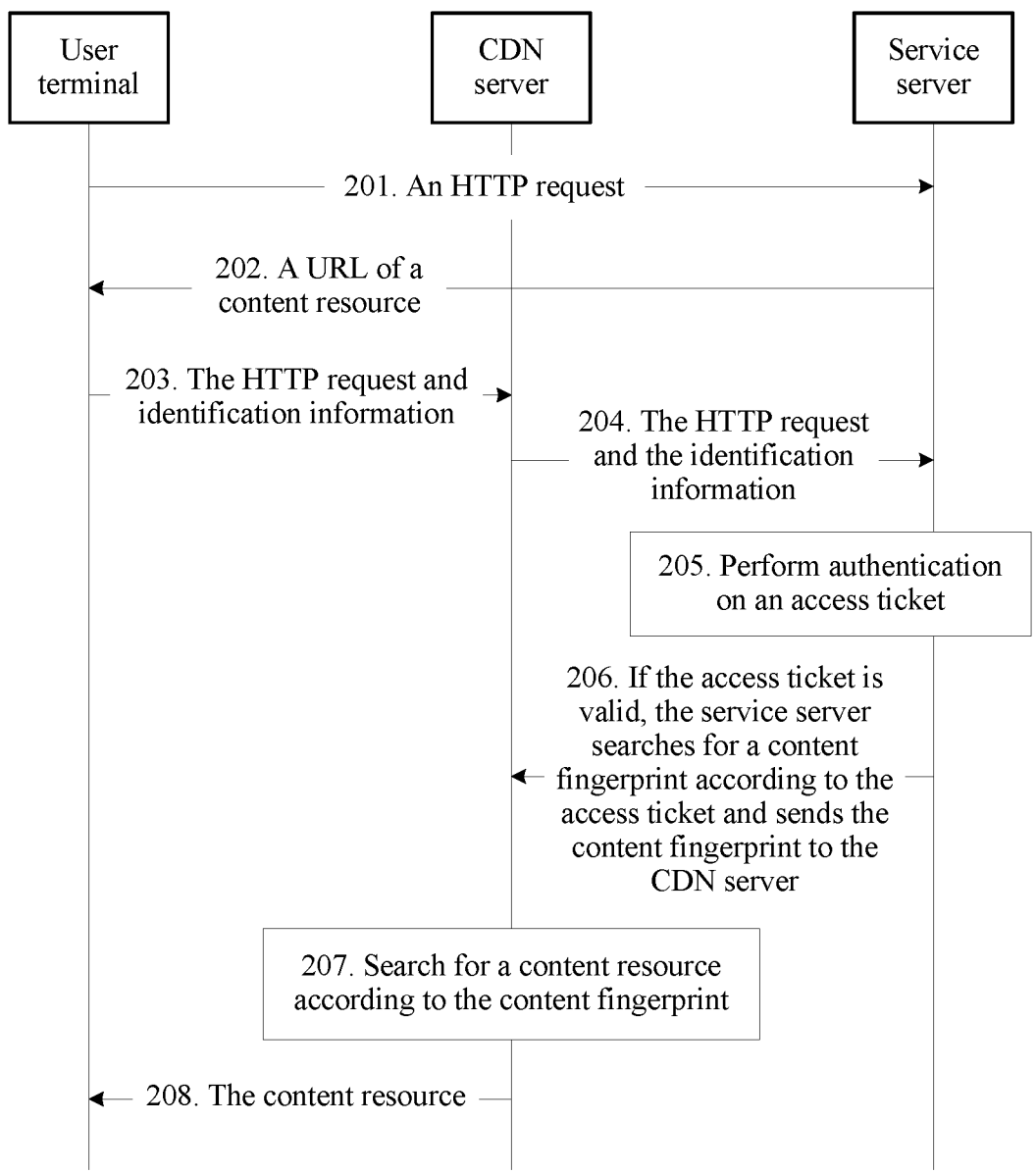
FIG. 2 is a schematic signaling flowchart of a CDN-based access control method according to an embodiment of the present disclosure.

To improve security of a content resource, an embodiment of the present disclosure provides a CDN-based access control method such that a content resource is searched for using a content fingerprint. Because the content fingerprint is saved in a CDN server and a service server, a possibility that an attacker directly obtains a URL using a user terminal and obtains a content resource using the URL may be avoided. Reference may be made to a signaling flowchart shown in FIG. 2.

Step 201: The user terminal sends an HTTP request to the service server, where the HTTP request is used to obtain the content resource.

Step 202: The service server generates a URL according to the HTTP request and sends the URL to the user terminal, where the URL carries an access ticket.

Step 203: The user terminal sends the HTTP request and identification information of the user terminal to the CDN server, where the HTTP request carries the access ticket.

Step 204: The CDN server sends the HTTP request from the user terminal and the identification information of the user terminal to the service server.

Step 205: The service server performs authentication on the access ticket according to the identification information of the user terminal.

Step 206: If the access ticket is valid, the service server searches for the content fingerprint according to the access ticket and sends the content fingerprint to the CDN server.

Step 207: The CDN server searches for the content resource according to the content fingerprint.

Step 208: The CDN server sends the content resource to the user terminal.

Figure 3:
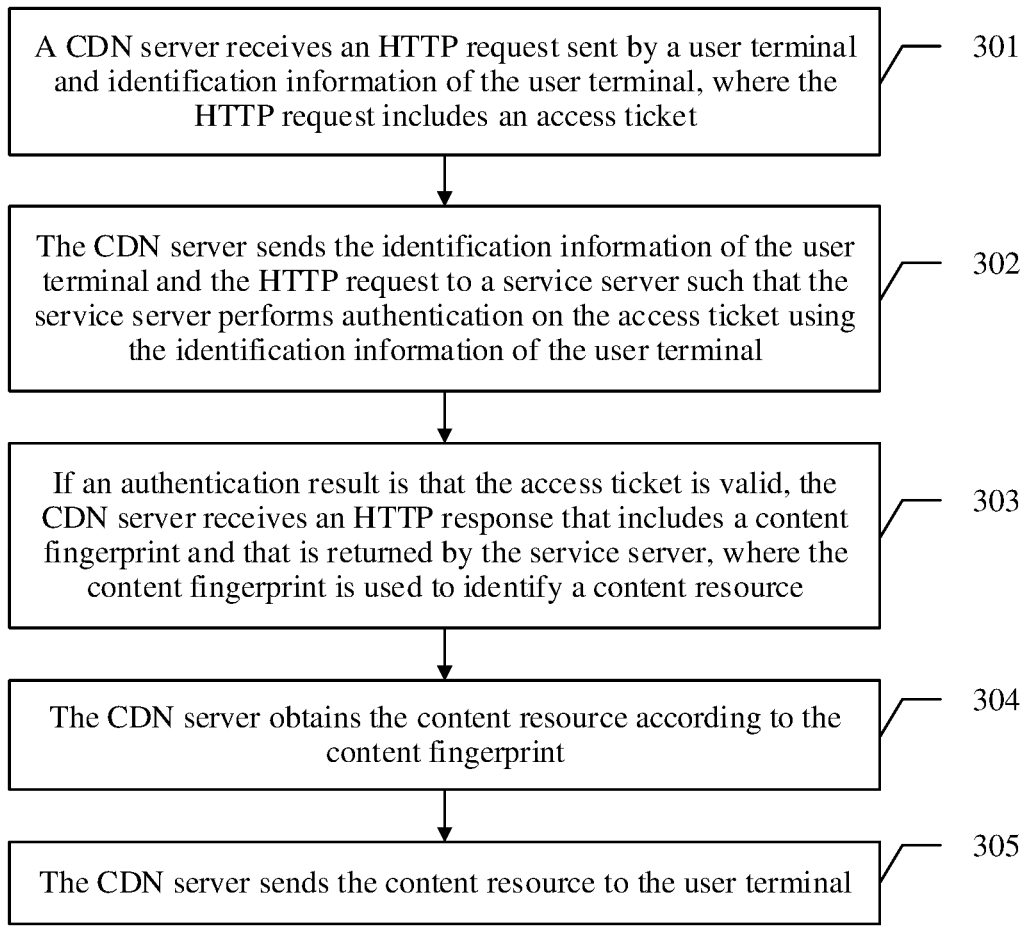
FIG. 3 is a schematic flowchart of a CDN-based access control method according to an embodiment of the present disclosure.

Referring to FIG. 3, an embodiment of a CDN-based access control method according to embodiments of the present disclosure includes the following steps.

Step 301: A CDN server receives an HTTP request sent by a user terminal and identification information of the user terminal, where the HTTP request includes an access ticket, and the access ticket is used to identify a user access permission.

In this embodiment, when a user accesses a content resource in a service server, the service server generates a URL pointing to a content resource in the CDN server and sends the URL to the user terminal. The user terminal may use the URL to generate the HTTP request, and the CDN server receives the request. The CDN server may further receive the identification information sent by the user terminal, and the identification information of the user terminal may be an IP address of the user terminal and be carried in a transmission control protocol (TCP)/IP request.

The URL includes the access ticket, and the access ticket is used to identify a permission of a content resource that can be accessed by the user. The URL further includes user session information, and the user session information is used to maintain an association request between the user terminal and the service server.

It should be noted that, in this embodiment, the CDN server does not search for a content resource or a content fingerprint according to the URL from the user terminal.

Step 302: The CDN server sends the identification information of the user terminal and the HTTP request to a service server such that the service server performs authentication on the access ticket using the identification information of the user terminal.

The CDN server sends the identification information of the user terminal and the HTTP request to the service server, and the service server may perform authentication on the access ticket using the identification information of the user terminal. If authentication on the access ticket succeeds, it indicates that the user has a permission to obtain the content resource, or if authentication on the access ticket fails, it indicates that the user has no permission to obtain the content resource.

Step 303: If an authentication result is that the access ticket is valid, the CDN server receives an HTTP response that includes a content fingerprint and that is returned by the service server, where the content fingerprint is used to identify a content resource.

The content fingerprint is a character string obtained by extracting a content abstract from the content resource, and performing a hash operation on the content abstract, that is, a digital fingerprint of the content resource that can uniquely identify the content resource. Encrypting a same content resource obtains a same content fingerprint, and encrypting different content resources obtains different content fingerprints. It should be noted that, although content resources with same content have different names or storage locations, the content resources still have a same content fingerprint.

Step 304: The CDN server obtains the content resource according to the content fingerprint.

The CDN server stores the content fingerprint and the content resource, and the content fingerprint corresponds to the content resource. After obtaining the content fingerprint, the CDN server may obtain the content resource according to the content fingerprint.

Step 305: The CDN server sends the content resource to the user terminal.

After obtaining the content resource, the CDN server sends the content resource to the user terminal.

In this embodiment of the present disclosure, a CDN server receives an HTTP request sent by a user terminal and identification information of the user terminal, where the HTTP request includes an access ticket, and the access ticket is used to identify a user access permission, sends the identification information of the user terminal and the HTTP request to a service server such that the service server performs authentication on the access ticket using the identification information of the user terminal, receives an HTTP response that includes a content fingerprint and that is returned by the service server if an authentication result is that the access ticket is valid, where the content fingerprint is used to identify a content resource, and obtains the content resource according to the content fingerprint and sends the content resource to the user terminal. The CDN server does not directly return the content resource to the user terminal according to the HTTP request, but searches for and returns the content resource according to the content fingerprint after receiving a result indicating that authentication performed by the service server on the HTTP request succeeds. The content fingerprint is stored by the service server and the CDN server, and is not passed through the user terminal. An intruder cannot obtain the content fingerprint using the user terminal, and cannot obtain the content resource without the content fingerprint. Therefore, security of the content resource is improved.

Optionally, in some embodiments of the present disclosure, that the CDN server obtains the content resource according to the content fingerprint is implemented in the following manner. If the CDN server does not store the content resource, the CDN server sends a content request including the content fingerprint to the service server such that the service server searches for the content resource according to the content fingerprint and the CDN server receives the content resource returned by the service server.

The CDN server may obtain the content resource from the service server according to the content fingerprint when the CDN server does not store the content resource.

Optionally, in some other embodiments of the present disclosure, before the CDN server receives the HTTP request sent by the user terminal and the identification information of the user terminal, the method includes that the CDN server receives the content resource and the content fingerprint that are sent by the service server, and the CDN server checks whether the CDN server has stored the content fingerprint or the content resource, saves the content resource and the content fingerprint if the CDN server does not store the content fingerprint or the content resource, or discards the content fingerprint and the content resource if the CDN server has stored the content fingerprint or the content resource.

In this embodiment of the present disclosure, the CDN server may receive the content resource and the content fingerprint that are sent by the service server, and check whether the CDN server has stored the content fingerprint. If the CDN server has stored the content fingerprint, it indicates that the CDN server has stored the content resource, that is, only one content resource is reserved, and the content resource may be discarded, or if the CDN server does not store the content fingerprint, it indicates that the CDN server does not store the content resource, and the content resource needs to be stored in order to provide a user with a CDN acceleration service. It should be noted that, when the CDN server has stored the content resource, the CDN server may also reserve a last received content resource and discard the stored content resource. Details are not limited herein.

It should be noted that, that the CDN server reserves one content resource is the best solution for reducing redundancy. In practical application, the CDN server may reserve a predetermined quantity of same content resources. After a quantity of same content resources reaches the predetermined quantity, when receiving a content resource the same as the content, the CDN server does not save the content resource in order to reduce redundancy.

Optionally, in some other embodiments of the present disclosure, if a quantity of times the content resource is accessed in a preset period of time is not greater than a preset threshold, the CDN server obtains an updated content resource and an updated content fingerprint from the service server.

Further, a value of the preset threshold may be obtained according to experience or an actual test, and is not limited herein. If the quantity of times the content resource is accessed in the preset period of time is less than or equal to the preset threshold, it indicates that the content resource receives no attention in this period of time, and the content resource needs to be replaced. The CDN server may send a content update request to the service server. The service server sends an updated content resource and an updated content fingerprint to the CDN server such that the CDN server completes content updating.

If the quantity of times the content resource is accessed in the preset period of time is greater than the preset threshold, it indicates that the content resource is popular, and the content resource does not need to be replaced. Compared with the other approaches in which the CDN server updates the content resource in a manner of periodically clearing the content resource, in the present disclosure, an infrequently accessed content resource may be updated immediately, and a popular content resource may be not updated such that the user may continue to access the content resource, improving user experience.

It should be noted that, after the CDN server replaces an original content resource and an original content fingerprint that are specified by the URL with the updated content resource and the updated content fingerprint, the CDN server may immediately delete the original content resource or may not delete the original content resource immediately. Because the service server points the URL to the updated content resource, the original content resource is no longer accessed by the user. The CDN server may delete the original content resource in a manner of periodically deleting a content resource with an excessively small quantity of access times.

Figure 4:
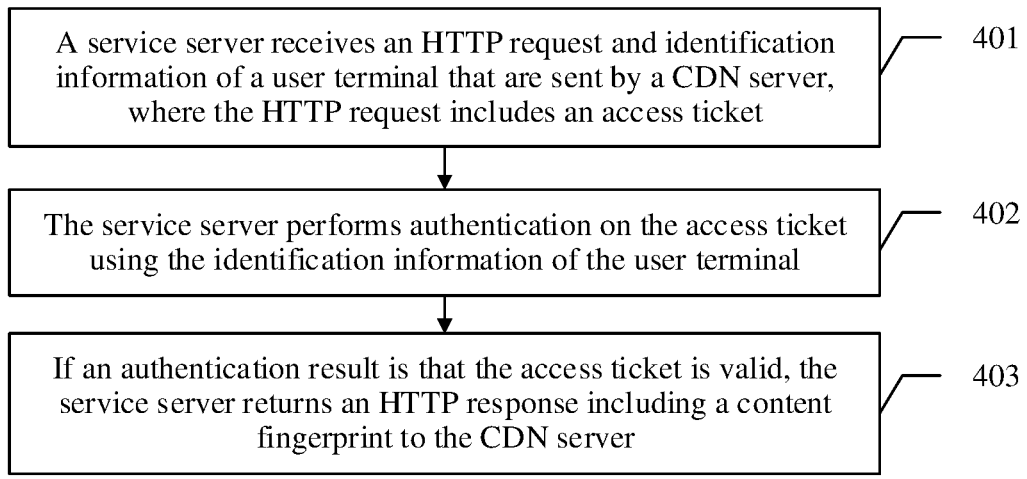
FIG. 4 is another schematic flowchart of a CDN-based access control method according to an embodiment of the present disclosure.

Referring to FIG. 4, another embodiment of a CDN-based access control method according to embodiments of the present disclosure includes the following steps.

Step 401: A service server receives an HTTP request and identification information of a user terminal that are sent by a CDN server, where the HTTP request includes an access ticket.

In this embodiment, the service server may receive the HTTP request and the identification information of the user terminal that are sent by the CDN server, where the HTTP request includes the access ticket, and the access ticket is used to identify a user access permission. The HTTP request further includes user session information, and the user session information is used to maintain an association request between the user terminal and the service server.

Step 402: The service server performs authentication on the access ticket using the identification information of the user terminal.

The service server may check whether the access ticket corresponds to the identification information of the user terminal, whether the access ticket corresponds to a user session, and whether the access ticket is in a validity period. It should be understood that, in practical application, one or more authentication manners may be used to perform authentication on the access ticket. This is not limited herein.

For a specific process in which the service server performs authentication on the access ticket, refer to the other approaches, and details are not described herein.

Step 403: If an authentication result is that the access ticket is valid, the service server returns an HTTP response including a content fingerprint to the CDN server such that the CDN server obtains a content resource according to the content fingerprint.

Optionally, in some embodiments of the present disclosure, the method further includes that the service server receives a content request that includes the content fingerprint and that is sent by the CDN server, the service server searches for the content resource according to the content fingerprint, and the service server sends the content resource to the CDN server.

Further, if the CDN server does not store the content resource, the CDN server may send the content request including the content fingerprint to the service server, and the service server may search for the content resource according to the content fingerprint and return the content resource to the CDN server.

Optionally, in some embodiments of the present disclosure, before the service server returns the HTTP response including the content fingerprint to the CDN server, the method includes the service server performs a hash operation on the content resource to obtain the content fingerprint, where the content fingerprint is used to identify the content resource, and the service server sends the content resource and the content fingerprint to the CDN server.

Further, an algorithm used by the service server to perform the hash operation on the content resource may be SHA512, SHA224, SHA256, or SHA384, or may be another secure hash operation. This is not limited herein. It should be understood that, the service server may send some or all of content resources and content fingerprints to the CDN server.

Optionally, in some embodiments of the present disclosure, after the service server returns the HTTP response including the content fingerprint to the CDN server, the method includes that the service server receives a content update request that includes a URL and that is sent by the CDN server, the service server searches for the content resource and the content fingerprint according to the URL, and the service server returns the content resource and the content fingerprint corresponding to the URL to the CDN server.

In this embodiment, in practical application, because the service server updates the content resource at intervals, the content fingerprint and the content resource corresponding to the URL are changed, and the content resource on the CDN server needs to be updated accordingly. The CDN server may send the URL to the service server, and the service server may find the content resource and the content fingerprint according to the URL, or return the content resource and the content fingerprint to the CDN server. The CDN server replaces an original content resource and an original content fingerprint that are specified by the URL with the updated content resource and the updated content fingerprint.

For ease of understanding, in the following, a specific application scenario is used to describe in detail the CDN-based access control method in the present disclosure.

When a user opens a website named "http://media.origin.com" and clicks and watches paid content "2.pdf" of the website, the website jumps to a payment page. After the user makes payment, the service server generates a URL, such as http://media.orgin.com/2.pdf?ticket=1?session=2, and returns the URL to a browser. The browser initiates, using the URL to the CDN server, a request for accessing "2.pdf". The CDN server sends the URL to the service server. The service server performs authentication on a ticket, and if authentication succeeds, searches for a content fingerprint 1 according to the URL and returns the content fingerprint 1 to the CDN server. The CDN server searches for "2.pdf" according to the content fingerprint 1 and returns "2.pdf" to the user.

Optionally, before the CDN server searches for "2.pdf" according to the content fingerprint 1, the service server may perform a hash operation on "2.pdf" to obtain the content fingerprint 1 and send the content fingerprint 1 and "2.pdf" to the CDN server.

Figure 5:
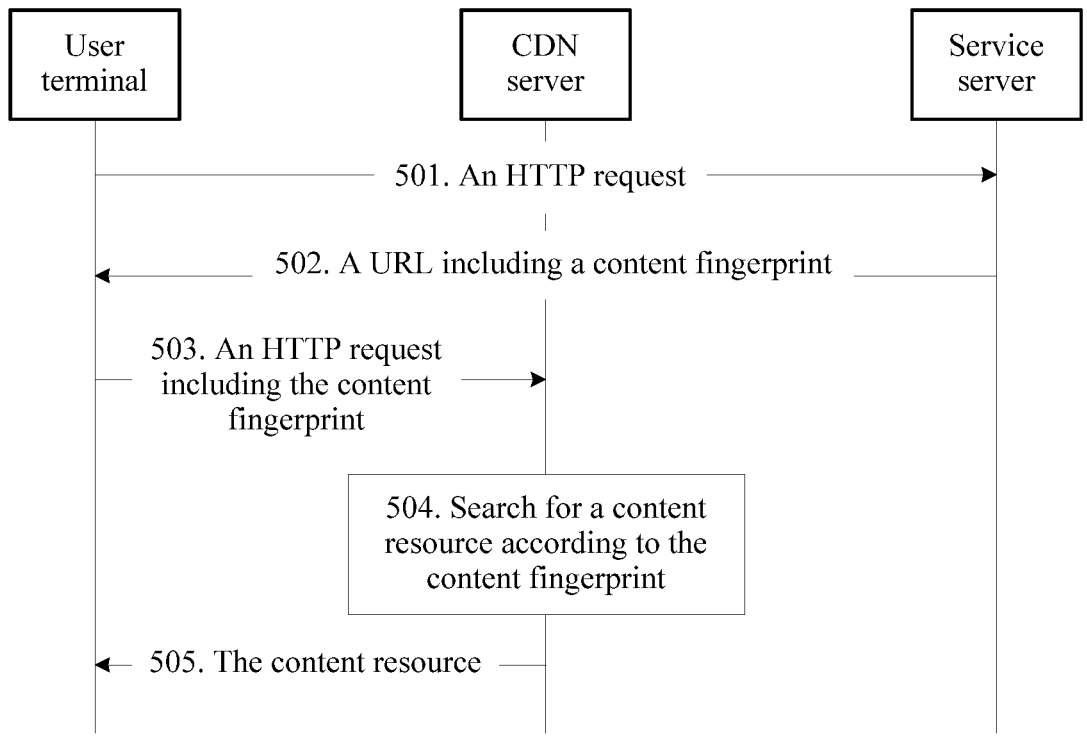
FIG. 5 is another schematic signaling flowchart of a CDN-based access control method according to an embodiment of the present disclosure.

In practical application, an embodiment of the present disclosure further provides a method for quickly accessing a content resource. The method may be used by a user to access a content resource that is in a service server and that does not need to be protected. Referring to FIG. 5, FIG. 5 is another signaling flowchart of a CDN-based access control method according to an embodiment of the present disclosure.

Step 501: A user terminal sends an HTTP request to a service server, where the HTTP request is used to obtain a content resource.

Step 502: The service server generates a URL including a content fingerprint according to the HTTP request and sends the URL to the user terminal.

Step 503: The user terminal sends the HTTP request to a CDN server, where the HTTP request carries the content fingerprint.

Step 504: The CDN server searches for the content resource according to the content fingerprint.

Step 505: The CDN server sends the content resource to the user terminal.

Figure 6:
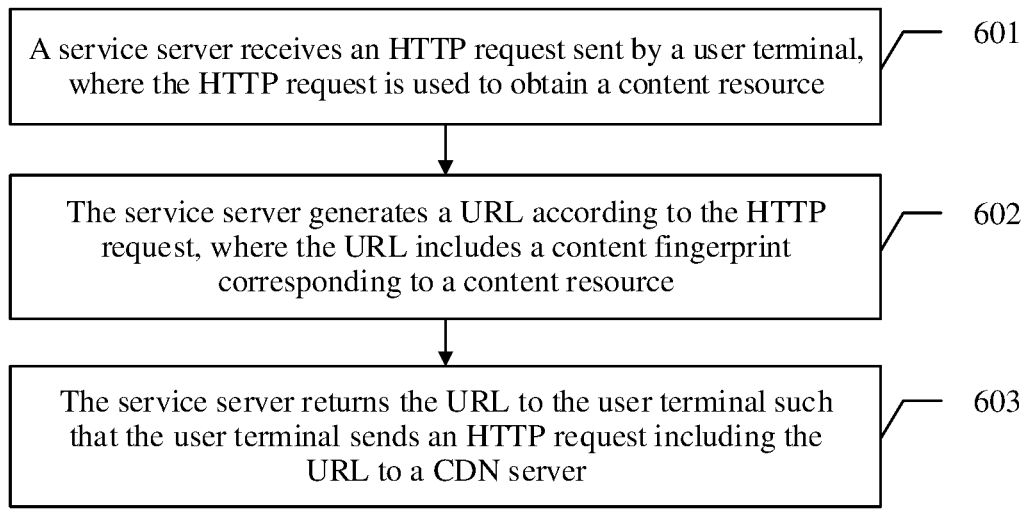
FIG. 6 is another schematic flowchart of a CDN-based access control method according to an embodiment of the present disclosure.

Referring to FIG. 6, another embodiment of a CDN-based access control method according to embodiments of the present disclosure includes the following steps.

Step 601: A service server receives an HTTP request sent by a user terminal, where the HTTP request is used to obtain a content resource.

In this embodiment, when a user accesses a content resource in the service server, the service server receives the HTTP request sent by the user terminal, where the HTTP request is used to obtain a content resource.

Step 602: The service server generates a URL according to the HTTP request, where the URL includes a content fingerprint corresponding to a content resource.

The service server checks whether the content resource accessed by the HTTP request needs to be protected. If the content resource is a content type that does not need to be protected, the service server may generate the URL including the content fingerprint, where the content fingerprint corresponds to the content resource that does not need to be protected.

Step 603: The service server returns the URL to the user terminal such that the user terminal sends an HTTP request including the URL to a CDN server.

After obtaining the URL, the service server returns the URL to the user terminal, and the user terminal may send the HTTP request including the URL to the CDN server.

Figure 7:
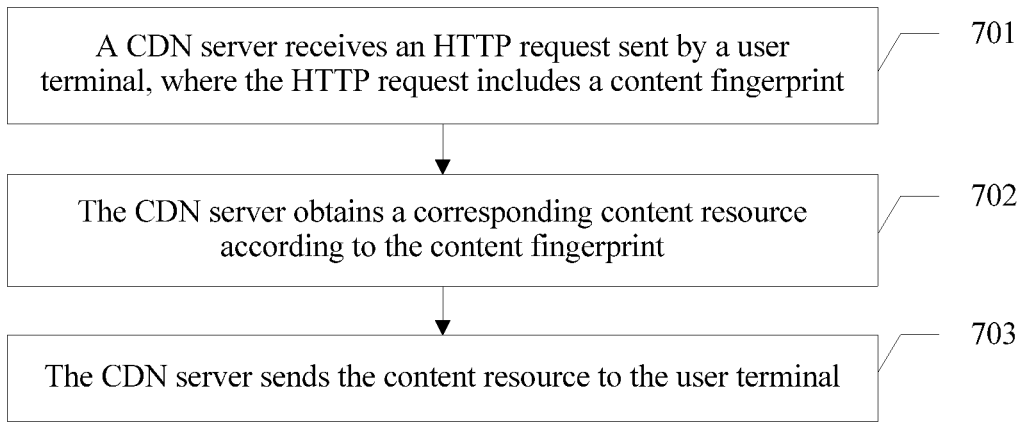
FIG. 7 is another schematic flowchart of a CDN-based access control method according to an embodiment of the present disclosure.

Referring to FIG. 7, another embodiment of a CDN-based access control method according to embodiments of the present disclosure includes the following steps.

Step 701: A CDN server receives an HTTP request sent by a user terminal, where the HTTP request includes a content fingerprint.

In this embodiment, the CDN server may receive the HTTP request sent by the user terminal, where the HTTP request includes the content fingerprint.

Step 702: The CDN server obtains a corresponding content resource according to the content fingerprint.

The CDN server stores the content fingerprint and the content resource, where the content fingerprint corresponds to the content resource. After obtaining the HTTP request, the CDN server may obtain the content resource according to the content fingerprint because the HTTP request carries the content fingerprint.

Step 703: The CDN server sends the content resource to the user terminal.

After obtaining the content resource, the CDN server may send the content resource to the user terminal.

Figure 8:
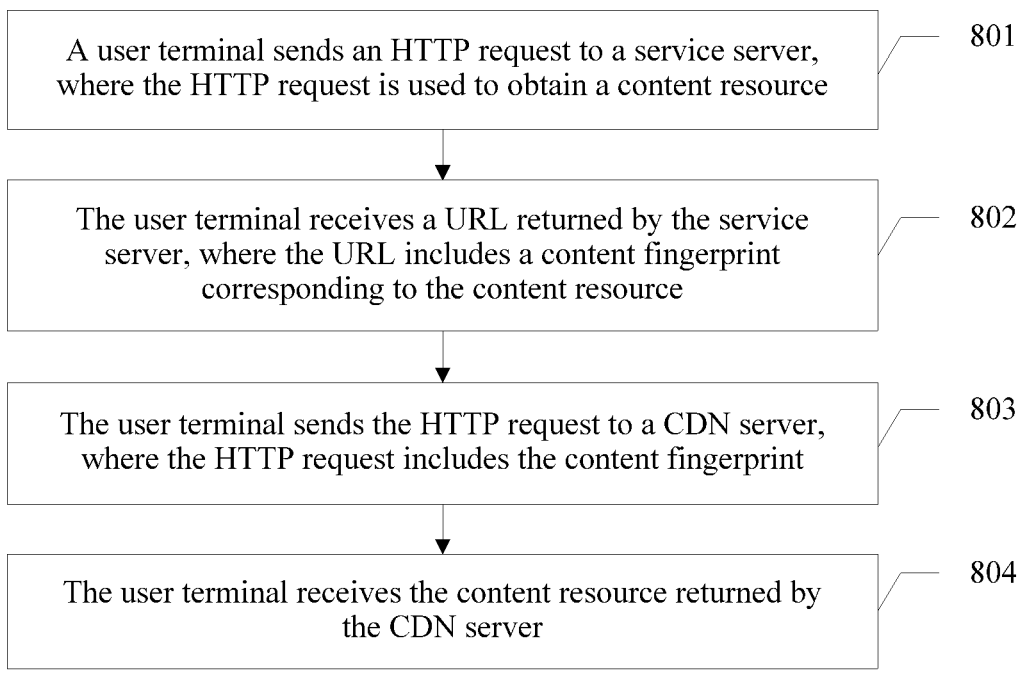
FIG. 8 is another schematic flowchart of a CDN-based access control method according to an embodiment of the present disclosure.

Referring to FIG. 8, another embodiment of a CDN-based access control method according to embodiments of the present disclosure includes the following steps.

Step 801: A user terminal sends an HTTP request to a service server, where the HTTP request is used to obtain a content resource.

In this embodiment, the user terminal may send the HTTP request to the service server, where the HTTP request is used to obtain the content resource.

Step 802: The user terminal receives a URL returned by the service server, where the URL includes a content fingerprint corresponding to the content resource.

The user terminal may receive the URL returned by the service server, where the URL includes the content fingerprint corresponding to the content resource.

Step 803: The user terminal sends the HTTP request to a CDN server, where the HTTP request includes the content fingerprint.

After obtaining the URL, the user terminal sends an HTTP request including the URL to the CDN server such that the CDN server obtains the corresponding content resource according to the content fingerprint in the URL.

Step 804: The user terminal receives the content resource returned by the CDN server.

For ease of understanding, in the following, another specific application scenario is used to describe in detail the CDN-based access control method in this embodiment of the present disclosure.

When a user opens a website "http://media.origin.com" and clicks and watches free content "1.gif" of the website, the service server generates a URL, such as http://media.orgin.com/1.gif?Fingerprint=3, and returns the URL to a browser. The browser initiates, using the URL to the CDN server, a request for accessing "1.gif". The CDN server checks that the URL includes a content fingerprint 3. The CDN server searches for "1.gif" according to the content fingerprint 3 and returns "1.gif" to the user.

Figure 9:
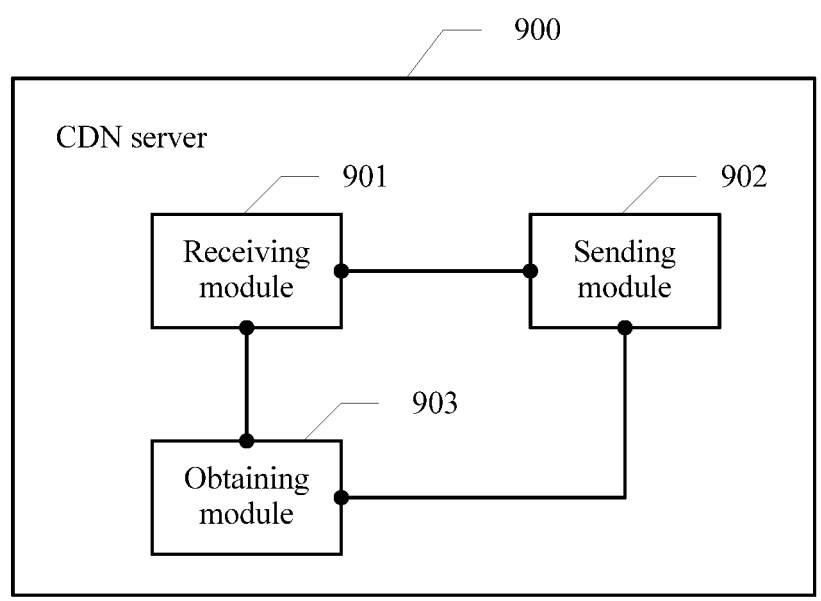
FIG. 9 is a schematic structural diagram of a CDN server according to an embodiment of the present disclosure.

The CDN-based access control method according to the embodiment of the present disclosure is described above from a perspective of a method, and the following describes in detail a CDN server according to an embodiment of the present disclosure from a perspective of an apparatus. Referring to FIG. 9, an embodiment of a CDN server 900 according to embodiments of the present disclosure includes a receiving module 901, a sending module 902, and an obtaining module 903.

The receiving module 901 is configured to receive an HTTP request sent by a user terminal and identification information of the user terminal, where the HTTP request includes an access ticket, and the access ticket is used to identify a user access permission.

The sending module 902 is configured to send the identification information of the user terminal and the HTTP request to a service server such that the service server performs authentication on the access ticket using the identification information of the user terminal.

The receiving module 901 is further configured to receive an HTTP response that includes a content fingerprint and that is returned by the service server if an authentication result is that the access ticket is valid, where the content fingerprint is used to identify a content resource.

The obtaining module 903 is configured to obtain the content resource according to the content fingerprint and then send the content resource to the user terminal.

In this embodiment of the present disclosure, a receiving module 901 receives an HTTP request sent by a user terminal and identification information of the user terminal, where the HTTP request includes an access ticket, and the access ticket is used to identify a user access permission. A sending module 902 sends the identification information of the user terminal and the HTTP request to a service server such that the service server performs authentication on the access ticket using the identification information of the user terminal. If an authentication result is that the access ticket is valid, the receiving module 901 receives an HTTP response that includes a content fingerprint and that is returned by the service server, where the content fingerprint is used to identify a content resource. An obtaining module 903 obtains the content resource according to the content fingerprint and then sends the content resource to the user terminal. The CDN server 900 does not directly return the content resource to the user terminal according to the HTTP request, but searches for and returns the content resource according to the content fingerprint after receiving a result indicating that authentication performed by the service server on the HTTP request succeeds. The content fingerprint is stored by the service server and the CDN server 900, and is not passed through the user terminal. An intruder cannot obtain the content fingerprint using the user terminal, and cannot obtain the content resource without the content fingerprint. Therefore, security of the content resource is improved.

Optionally, in some embodiments of the present disclosure, the sending module 902 is further configured to send an HTTP request including the content fingerprint to the service server if the CDN server 900 does not store the content resource such that the service server searches for the content resource according to the content fingerprint, and the receiving module 901 is further configured to receive the content resource returned by the service server.

Figure 10:
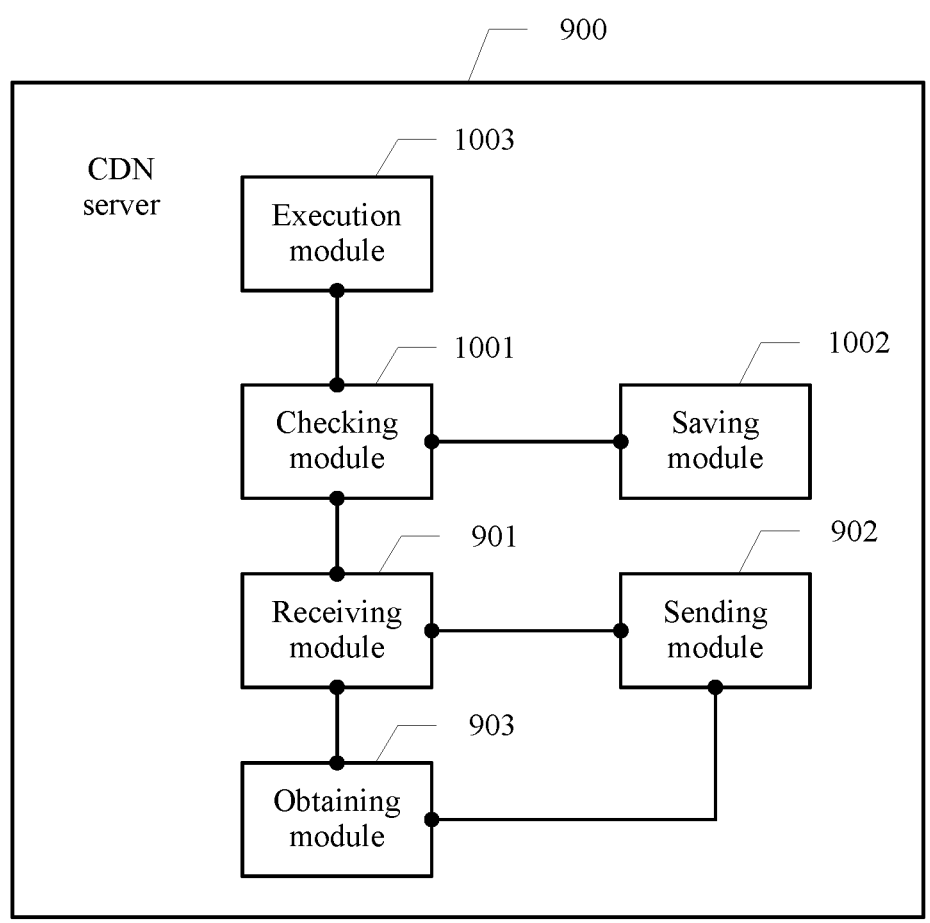
FIG. 10 is another schematic structural diagram of a CDN server according to an embodiment of the present disclosure.

Optionally, referring to FIG. 10, in some embodiments of the present disclosure, the receiving module 901 is further configured to receive the content fingerprint that is sent by the service server and the content resource, and the CDN server 900 further includes a checking module 1001 configured to check whether the CDN server 900 has stored the content fingerprint, trigger a step in which a saving module 1002 saves the content resource and the content fingerprint if the CDN server 900 does not store the content fingerprint, or trigger an execution module 1003 to discard the content fingerprint and the content resource if the CDN server 900 has stored the content fingerprint. The saving module 1002 is configured to save the content fingerprint and the content resource, and the execution module 1003 is configured to discard the content fingerprint and the content resource.

Optionally, in some embodiments of the present disclosure, the obtaining module 903 is further configured to obtain an updated content resource and an updated content fingerprint from the service server if a quantity of times the content resource is accessed in a preset period of time is not greater than a preset threshold.

Figure 11:
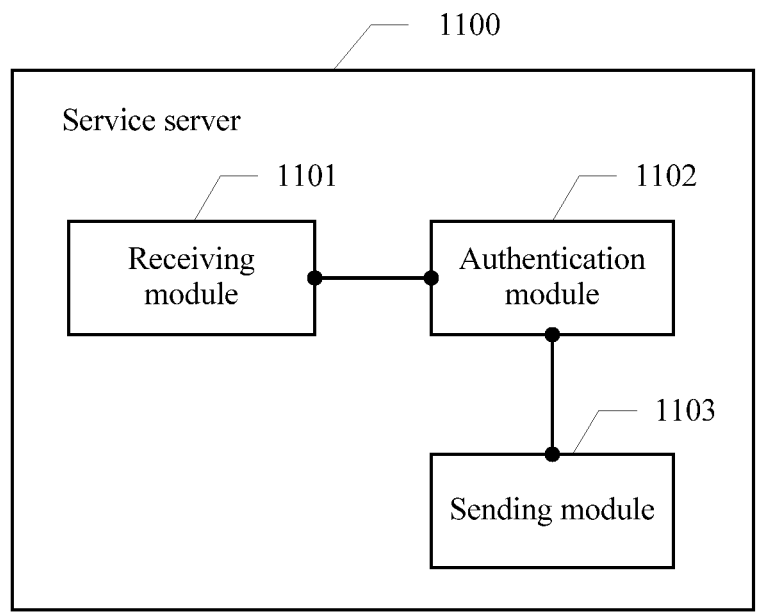
FIG. 11 is a schematic structural diagram of a service server according to an embodiment of the present disclosure.

Referring to FIG. 11, an embodiment of a service server 1100 according to embodiments of the present disclosure includes a receiving module 1101 configured to receive an HTTP request and identification information of a user terminal that are sent by a CDN server, where the HTTP request includes an access ticket, an authentication module 1102 configured to perform authentication on the access ticket using the identification information of the user terminal, and a sending module 1103 configured to return an HTTP response including a content fingerprint to the CDN server if an authentication result is that the access ticket is valid such that the CDN server obtains a content resource according to the content fingerprint.

Optionally, in some embodiments of the present disclosure, the receiving module 1101 is further configured to receive a content request that includes the content fingerprint and that is sent by the CDN server, and the sending module 1103 is further configured to send the content resource corresponding to the content fingerprint to the CDN server.

Figure 12:
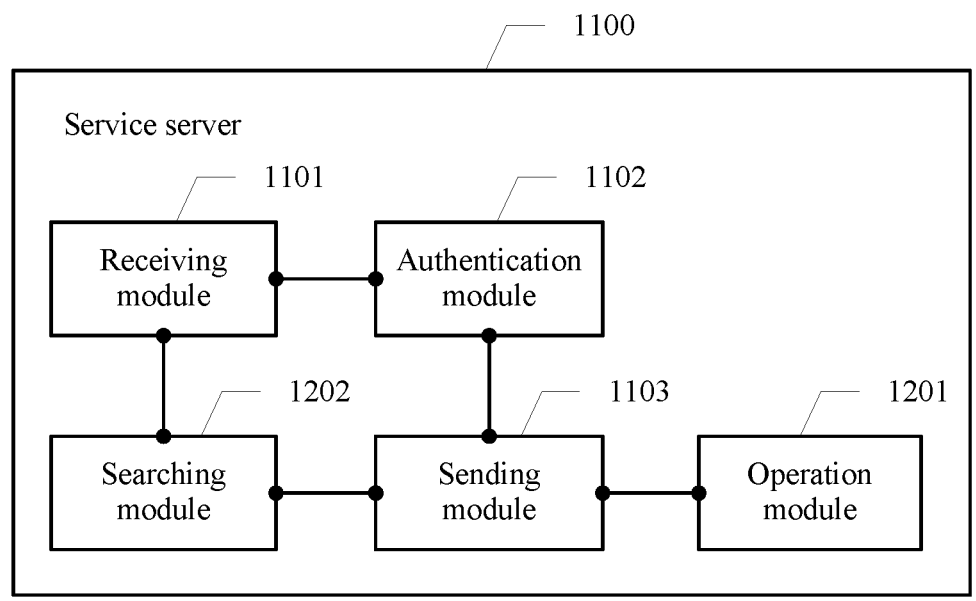
FIG. 12 is another schematic structural diagram of a service server according to an embodiment of the present disclosure.

Optionally, as shown in FIG. 12, in some other embodiments of the present disclosure, the service server 1100 further includes an operation module 1201 configured to perform a hash operation on the content resource to obtain the content fingerprint, where the content fingerprint is used to identify the content resource, and the sending module 1103 is further configured to send the content resource and the content fingerprint to the CDN server.

Optionally, in some other embodiments of the present disclosure, the receiving module 1101 is further configured to receive a content update request that includes a URL and that is sent by the CDN server, and the service server 1100 further includes a searching module 1202 configured to search for the content resource and the content fingerprint according to the URL, and the sending module 1103 is further configured to return the content resource and the content fingerprint corresponding to the URL to the CDN server.

For ease of understanding, in the following, a specific application scenario is used to describe in detail interaction between network elements or between modules in each network element in a CDN-based access control method in this embodiment of the present disclosure.

In a specific application scenario of this embodiment of the present disclosure, the identification information of the user terminal is an IP address of a user. When the user opens a website named "http://media.origin.com" and clicks and watches paid content "2.pdf" of the website, the website jumps to a payment page. After the user makes payment, the receiving module 1101 of the service server 1100 receives the HTTP request sent by the user terminal and the identification information of the user terminal, generates a URL, such as http://media.orgin.com/2.pdf?ticket=1?session=2, and returns the URL to a browser. The browser initiates, using the URL to the CDN server 900, a request for accessing "2.pdf". The receiving module 901 of the CDN server 900 receives the HTTP request sent by the user terminal and the IP address of the user. The sending module 902 of the CDN server 900 sends the URL and the IP address of the user to the receiving module 1101 of the service server 1100. The authentication module 1102 of the service server 1100 performs authentication on a ticket using the IP address of the user. If authentication on the ticket succeeds, the sending module 1103 of the service server 1100 returns a content fingerprint 1 corresponding to the URL to the receiving module 901 of the CDN server 900. The obtaining module 903 of the CDN server 900 obtains "2.pdf" according to the content fingerprint 1 and returns "2.pdf" to the user terminal.

Optionally, before the CDN server 900 returns "2.pdf" to the user terminal, the operation module 1201 of the service server 1100 may perform a hash operation on "2.pdf" to obtain the content fingerprint 1. The sending module 1103 of the service server 1100 sends the content fingerprint 1 and "2.pdf" to the CDN server.

Figure 13:
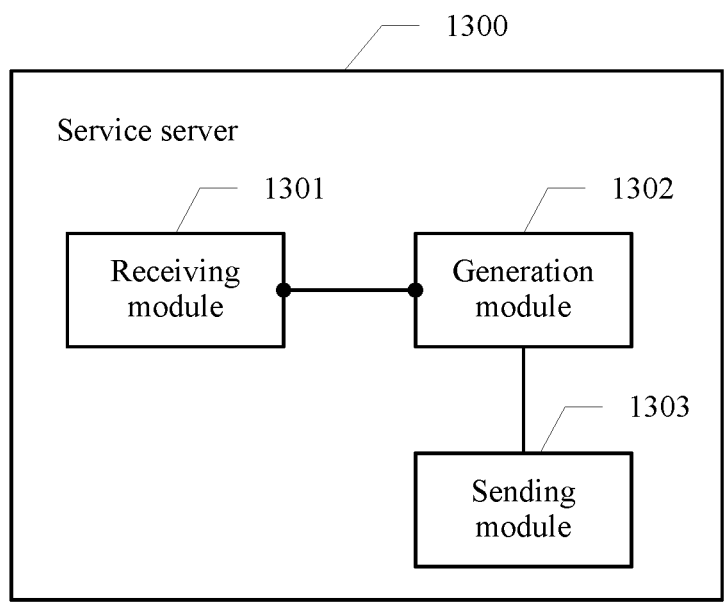
FIG. 13 is another schematic structural diagram of a service server according to an embodiment of the present disclosure.

Referring to FIG. 13, another embodiment of a service server 1300 according to embodiments of the present disclosure includes a receiving module 1301 configured to receive an HTTP request sent by a user terminal, where the HTTP request is used to obtain a content resource, a generation module 1302 configured to generate a URL according to the HTTP request, where the URL includes a content fingerprint corresponding to the content resource, and a sending module 1303 configured to return the URL to the user terminal such that the user terminal sends an HTTP request including the URL to a CDN server.

Figure 14:
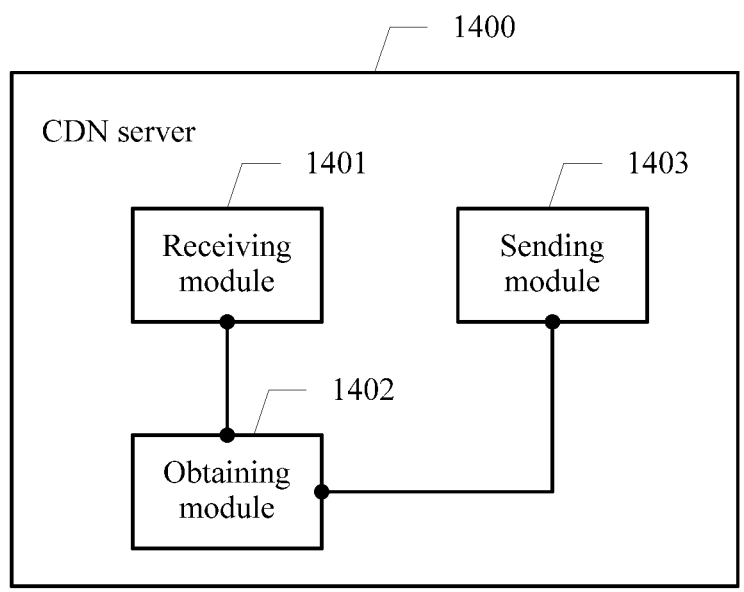
FIG. 14 is another schematic structural diagram of a CDN server according to an embodiment of the present disclosure.

Referring to FIG. 14, another embodiment of a CDN server 1400 according to embodiments of the present disclosure includes a receiving module 1401 configured to receive an HTTP request sent by a user terminal, where the HTTP request includes a content fingerprint, an obtaining module 1402 configured to obtain a corresponding content resource according to the content fingerprint, and a sending module 1403 configured to send the content resource to the user terminal.

Figure 15:
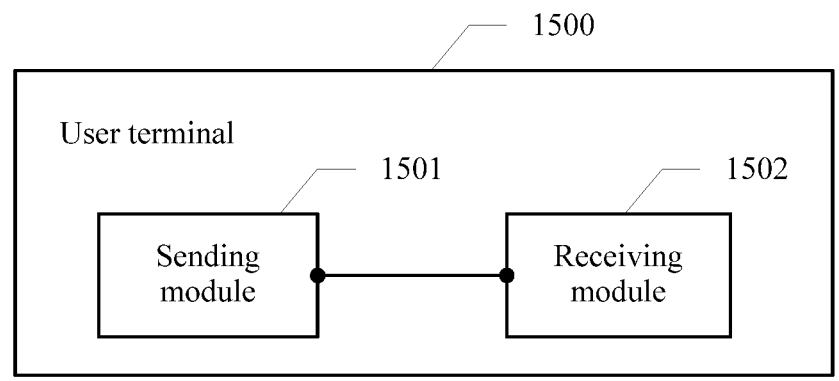
FIG. 15 is a schematic structural diagram of a user terminal according to an embodiment of the present disclosure.

Referring to FIG. 15, an embodiment of a user terminal 1500 according to embodiments of the present disclosure includes a sending module 1501 configured to send an HTTP request to a service server, where the HTTP request is used to obtain a content resource, and a receiving module 1502 configured to receive a URL returned by the service server, where the URL includes a content fingerprint corresponding to the content resource.

The sending module 1501 is further configured to send the HTTP request to a CDN server, where the HTTP request includes the content fingerprint.

The receiving module 1502 is further configured to receive the content resource returned by the CDN server.

For ease of understanding, in the following, a specific application scenario is used to describe in detail interaction between network elements or between modules in each network element in a CDN-based access control method in this embodiment of the present disclosure.

In an example in which the content resource is "1.gif", when a user opens a website named "http://media.origin.com" and clicks and watches free content "1.gif" of the website, the sending module 1501 of the user terminal 1500 sends an HTTP request to the service server 1300. The receiving module 1301 of the service server 1300 receives the HTTP request sent by the user terminal 1500, and the generation module 1302 generates a URL, such as http://media.orgin.com/1.gif?Fingerprint=3. The sending module 1303 of the service server 1300 returns the URL to the receiving module 1502 of the user terminal 1500. The sending module 1501 of the user terminal 1500 initiates, using the URL to the CDN server 1400, an HTTP request for accessing "1.gif". The receiving module 1401 of the CDN server 1400 receives the HTTP request. Because the URL includes a content fingerprint 3, the obtaining module 1402 of the CDN server 1400 obtains "1.gif" according to the content fingerprint 3. The sending module 1403 of the CDN server 1400 returns "1.gif" to the user terminal 1500, and the receiving module 1502 of the user terminal 1500 receives "1.gif".

Figure 16:
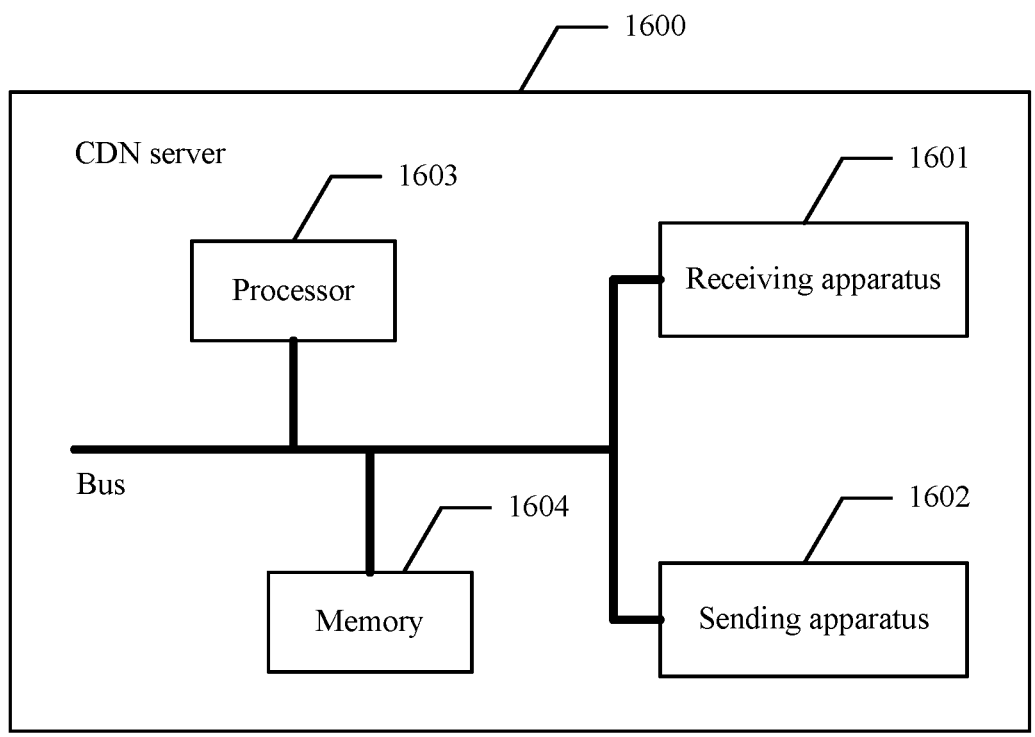
FIG. 16 is another schematic structural diagram of a CDN server according to an embodiment of the present disclosure.

The foregoing describes the CDN server in this embodiment of the present disclosure from a perspective of a cellular functional entity, and the following describes the CDN server in this embodiment of the present disclosure from a perspective of hardware processing. Referring to FIG. 16, another embodiment of the CDN server 1600 in this embodiment of the present disclosure includes a receiving apparatus 1601, a sending apparatus 1602, a processor 1603, and a memory 1604. A quantity of processors 1603 in the CDN server 1600 may be one or more, and one processor 1603 is used as an example in FIG. 16. The processor 1603 and the memory 1604 receive information about external user terminal using the receiving apparatus 1601, and the processor 1603 and the memory 1604 transmit the information to the external user terminal using the sending apparatus 1602. In some embodiments of the present disclosure, the receiving apparatus 1601, the sending apparatus 1602, the processor 1603, and the memory 1604 may be connected using a bus or in another manner. In FIG. 16, a bus connection is used as an example.

The receiving apparatus 1601 is configured to receive an HTTP request sent by a user terminal and identification information of the user terminal, where the HTTP request includes an access ticket, and the access ticket is used to identify a user access permission.

The sending apparatus 1602 is configured to send the identification information of the user terminal and the HTTP request to a service server such that the service server performs authentication on the access ticket using the identification information of the user terminal.

The receiving apparatus 1601 is configured to receive an HTTP response that includes a content fingerprint and that is returned by the service server if an authentication result is that the access ticket is valid, where the content fingerprint is used to identify a content resource.

The processor 1603 is configured to obtain the content resource according to the content fingerprint and then send the content resource to the user terminal.

The memory 1604 may include a read-only memory (ROM) and a random access memory (RAM) and provide the processor 1603 with an instruction and data. A part of the memory 1604 may further include a high-speed RAM, or may further include a non-volatile memory.

The memory 1604 stores the elements such as an executable module or a data structure, or a subset thereof, or an extended set thereof, an operation instruction, including various operation instructions, which are used to implement various operations, an operating system, including various system programs, which are used to implement various basic services and process hardware-based tasks.

The receiving apparatus 1601 is further configured to receive the content fingerprint that is sent by the service server and the content resource.

The processor 1603 is further configured to check whether the processor 1603 has stored the content fingerprint, save the content fingerprint and the content resource if the processor 1603 does not store the content fingerprint, or discard the content fingerprint and the content resource if the processor 1603 has stored the content fingerprint.

The processor 1603 is further configured to obtain an updated content resource and an updated content fingerprint from the service server if a quantity of times the content resource is accessed in a preset period of time is not greater than a preset threshold.

Figure 17:
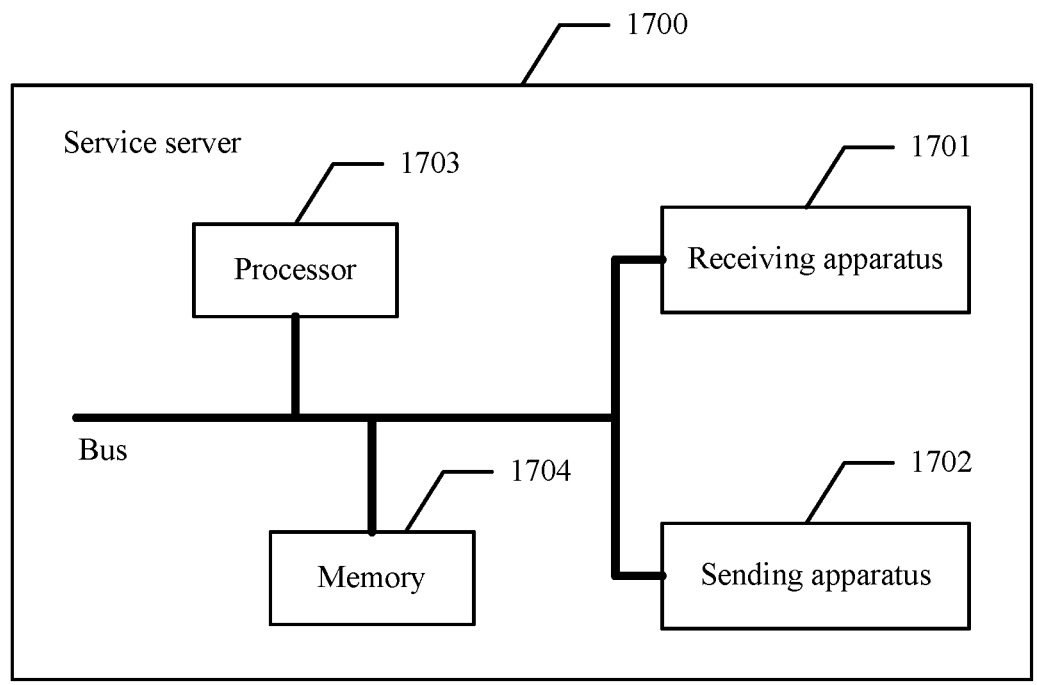
FIG. 17 is another schematic structural diagram of a service server according to an embodiment of the present disclosure.

Referring to FIG. 17, another embodiment of a service server 1700 according to embodiments of the present disclosure includes a receiving apparatus 1701, a sending apparatus 1702, a processor 1703, and a memory 1704. A quantity of processors 1703 in a service server 1700 may be one or more, and one processor 1703 is used as an example in FIG. 17. The processor 1703 and the memory 1704 receive information about external user terminal using the receiving apparatus 1701, and the processor 1703 and the memory 1704 transmit the information to the external user terminal using the sending apparatus 1702. In some embodiments of the present disclosure, the receiving apparatus 1701, the sending apparatus 1702, the processor 1703, and the memory 1704 may be connected using a bus or in another manner. In FIG. 17, a bus connection is used as an example.

The receiving apparatus 1701 is configured to receive an HTTP request and identification information of a user terminal that are sent by a CDN server, where the HTTP request includes an access ticket.

The processor 1703 is configured to perform authentication on the access ticket using the identification information of the user terminal.

The sending apparatus 1702 is configured to return an HTTP response including a content fingerprint to the CDN server if an authentication result is that the access ticket is valid such that the CDN server obtains a content resource according to the content fingerprint.

The memory 1704 may include a ROM and a RAM and provide the processor 1703 with an instruction and data. A part of the memory 1704 may further include a RAM, or may further include a non-volatile memory.

The memory 1704 stores the elements such as an executable module or a data structure, or a subset thereof, or an extended set thereof, an operation instruction, including various operation instructions, which are used to implement various operations, an operating system, including various system programs, which are used to implement various basic services and process hardware-based tasks.

The processor 1703 is further configured to perform a hash operation on the content resource to obtain the content fingerprint, where the content fingerprint is used to identify the content resource.

The sending apparatus 1702 is configured to send the content resource and the content fingerprint to the CDN server.

The receiving apparatus 1701 is further configured to receive a content update request that includes a URL and that is sent by the CDN server.

The processor 1703 is further configured to search for the content resource and the content fingerprint according to the URL.

The sending apparatus 1702 is further configured to return the content resource and the content fingerprint corresponding to the URL to the CDN server.

Referring to FIG. 17, another embodiment of the service server 1700 according to embodiments of the present disclosure includes the receiving apparatus 1701 configured to receive an HTTP request sent by a user terminal, where the HTTP request is used to obtain a content resource, the processor 1703 configured to generate a URL according to the HTTP request, where the URL includes a content fingerprint corresponding to the content resource, and the sending apparatus 1702 configured to return the URL to the user terminal such that the user terminal sends an HTTP request including the URL to a CDN server.

Referring to FIG. 16, another embodiment of the CDN server 1600 according to embodiments of the present disclosure includes a receiving apparatus 1601 configured to receive an HTTP request sent by a user terminal, where the HTTP request includes a content fingerprint, a processor 1603 configured to obtain a corresponding content resource according to the content fingerprint, and a sending apparatus 1602 configured to send the content resource to the user terminal.

Figure 18:
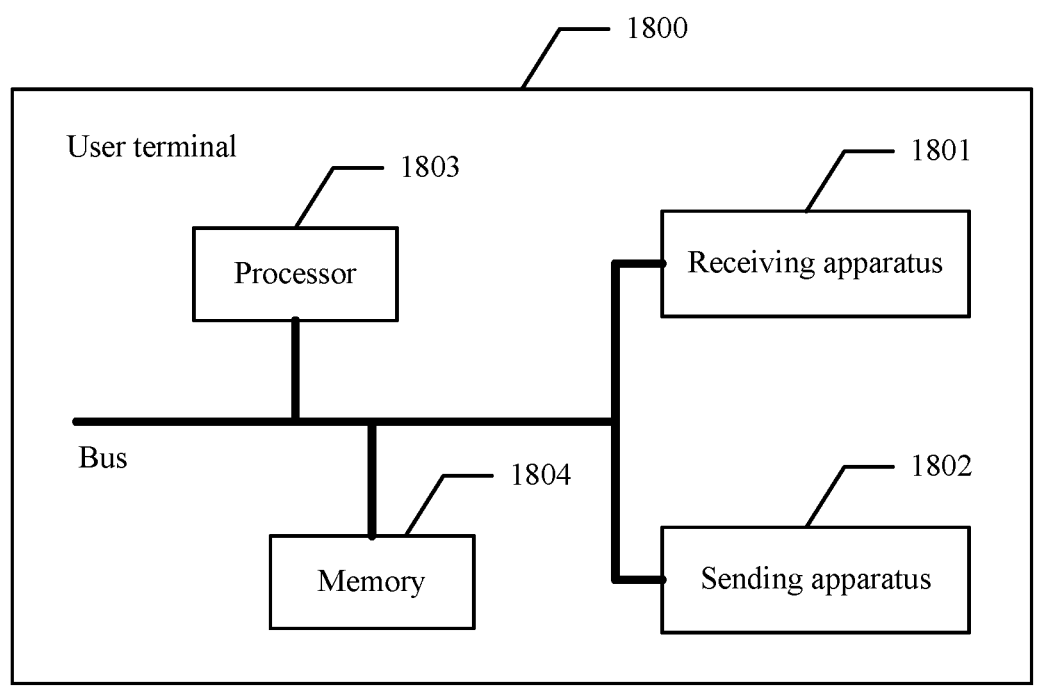
FIG. 18 is another schematic structural diagram of a user terminal according to an embodiment of the present disclosure.

Referring to FIG. 18, another embodiment of a user terminal 1800 according to embodiments of the present disclosure includes a receiving apparatus 1801, a sending apparatus 1802, a processor 1803, and a memory 1804. A quantity of processors 1803 in a user terminal 1800 may be one or more, and one processor 1803 is used as an example in FIG. 18. The processor 1803 and the memory 1804 receive information using the receiving apparatus 1801, and the processor 1803 and the memory 1804 transmit the information using the sending apparatus 1802. In some embodiments of the present disclosure, the receiving apparatus 1801, the sending apparatus 1802, the processor 1803, and the memory 1804 may be connected using a bus or in another manner. In FIG. 18, a bus connection is used as an example.

The sending apparatus 1802 is configured to send an HTTP request to a service server, where the HTTP request is used to obtain a content resource.

The receiving apparatus 1801 is configured to receive a URL returned by the service server, where the URL includes a content fingerprint corresponding to the content resource.

The sending apparatus 1802 is further configured to send the HTTP request to a CDN server, where the HTTP request includes the content fingerprint.

The receiving apparatus 1801 is further configured to receive the content resource returned by the CDN server.

The memory 1804 may include a ROM and a RAM and provide the processor 1803 with an instruction and data. A part of the memory 1804 may further include a RAM, or may further include a non-volatile memory.

The memory 1804 stores the elements an executable module or a data structure, or a subset thereof, or an extended set thereof, an operation instruction, including various operation instructions, which are used to implement various operations, an operating system, including various system programs, which are used to implement various basic services and process hardware-based tasks.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A content delivery network (CDN) based (CDN based) access control method, comprising:
   receiving, by a CDN server, a hypertext transfer protocol (HTTP) request from a user terminal and identification information of the user terminal, wherein the HTTP request comprises an access ticket identifying a user access permission;
   sending, by the CDN server, the identification information of the user terminal and the HTTP request to a service server;
   receiving, by the CDN server from the service server, an HTTP response comprising a content fingerprint when an authentication result indicates that the access ticket is valid, wherein the content fingerprint identifies a content resource and is not passed through the user terminal;
   storing, by the CDN server, the content fingerprint;
   obtaining, by the CDN server, the content resource according to the content fingerprint; and
   sending, by the CDN server, the content resource to the user terminal.

2. The method according to claim 1, wherein before receiving the HTTP request and the identification information, the method further comprises:
   receiving, by the CDN server, the content fingerprint and the content resource from the service server;
   checking, by the CDN server, whether the CDN server has stored the content fingerprint; and
   discarding, by the CDN server, the content fingerprint and the content resource after the CDN server has stored the content fingerprint.

3. The method according to claim 1, wherein before receiving the HTTP request and the identification information, the method further comprises:
   receiving, by the CDN server, the content fingerprint and the content resource from the service server;
   checking, by the CDN server, whether the CDN server has stored the content resource; and
   discarding, by the CDN server, the content fingerprint and the content resource when the CDN server has stored the content resource.

4. The method according to claim 1, wherein after sending the content resource to the user terminal, the method further comprises obtaining, by the CDN server, an updated content resource and an updated content fingerprint from the service server when a quantity of times the content resource is accessed in a preset period of time is not greater than a preset threshold.

5. The method according to claim 1, wherein obtaining, by the CDN server, the content resource according to the content fingerprint comprises:
   sending, by the CDN server, a content request to the service server, wherein the content request comprises the content fingerprint, and
   receiving, by the CDN server, the content resource from the service server in response to the content request.

6. The method according to claim 1, wherein obtaining, by the CDN server, the content resource according to the content fingerprint comprises obtaining, by the CDN server from local storage, the content resource according to the content fingerprint.

7. The method according to claim 1, further comprising:
   sending, by the CDN server, a content update request to the service server when a number of times the content resource is accessed is fewer than a preset threshold number of times; and
   receiving, by the CDN server, an updated content resource and an updated content fingerprint from the service server.

8. A content delivery network (CDN) based access control method, comprising:
   receiving, by a service server from a CDN server, a hypertext transfer protocol (HTTP) request and identification information of a user terminal, wherein the HTTP request comprises an access ticket identifying a user access permission;
   performing, by the service server, an authentication on the access ticket using the identification information; and returning, by the service server to the CDN server, an HTTP response comprising a content fingerprint when an authentication result indicates that the access ticket is valid.

9. The method according to claim 8, wherein before returning the HTTP response, the method further comprises:
performing, by the service server, a hash operation on a content resource to obtain the content fingerprint; and
sending, by the service server, the content resource and the content fingerprint to the CDN server.

10. The method according to claim 8, wherein after returning the HTTP response, the method further comprises:
receiving, by the service server, a content update request comprising a uniform resource locator (URL) from the CDN server;
searching, by the service server, for a content resource and the content fingerprint according to the URL; and
returning, by the service server, the content resource and the content fingerprint corresponding to the URL to the CDN server.

11. A content delivery network (CDN) server, comprising:
a receiver apparatus configured to receive a hypertext transfer protocol (HTTP) request from a user terminal and identification information, wherein the HTTP request comprises an access ticket identifying a user access permission;
a transmitter apparatus configured to send the identification information and the HTTP request to a service server,
wherein the receiver apparatus is further configured to receive, from the service server, an HTTP response comprising a content fingerprint when an authentication result indicates that the access ticket is valid, and wherein the content fingerprint identifies a content resource and is not passed through the user terminal; and
a hardware processor coupled to the receiver apparatus and the transmitter apparatus and configured to:
store the content fingerprint;
obtain the content resource according to the content fingerprint; and
send, using the transmitter apparatus, the content resource to the user terminal.

12. The CDN server according to claim 11, wherein the receiver apparatus is further configured to receive the content fingerprint and the content resource from the service server, and wherein the hardware processor is further configured to:
check whether the hardware processor has stored the content fingerprint; and
discard the content fingerprint and the content resource after the processor has stored the content fingerprint.

13. The CDN server according to claim 11, wherein the hardware processor is further configured to obtain an updated content resource and an updated content fingerprint from the service server when a quantity of times the content resource is accessed in a preset period of time is not greater than a preset threshold.

14. A service server, comprising:
a receiver apparatus configured to receive a hypertext transfer protocol (HTTP) request and identification information of a user terminal from a content delivery network (CDN) server, wherein the HTTP request comprises an access ticket;
a hardware processor coupled to the receiver apparatus and configured to perform authentication on the access ticket using the identification information; and
a transmitter apparatus coupled to the hardware processor and configured to return an HTTP response comprising a content fingerprint to the CDN server when an authentication result indicates that the access ticket is valid.

15. The service server according to claim 14, wherein the hardware processor is further configured to perform a hash operation on a content resource to obtain the content fingerprint identifying the content resource, and wherein the transmitter apparatus is further configured to send the content resource and the content fingerprint to the CDN server.

16. The service server according to claim 14, wherein the receiver apparatus is further configured to receive a content update request comprising a uniform resource locator (URL) from the CDN server, wherein the hardware processor is further configured to search for a content resource and the content fingerprint according to the URL, and wherein the transmitter apparatus is further configured to return the content resource and the content fingerprint corresponding to the URL to the CDN server.

17. A computer program product comprising computer-executable instructions stored on a non-transitory computer-readable medium that, when executed by a processor, cause a content delivery network (CDN) server to:
receive a hypertext transfer protocol (HTTP) request from a user terminal and identification information of the user terminal, wherein the HTTP request comprises an access ticket identifying a user access permission;
send the identification information of the user terminal and the HTTP request to a service server;
receive, from a service server, an HTTP response comprising a content fingerprint when an authentication result indicates that the access ticket is valid, wherein the content fingerprint identifies a content resource and does not pass through the user terminal;
store the content fingerprint;
obtain the content resource according to the content fingerprint; and
send the content resource to the user terminal.

18. The computer program product of claim 17, wherein before receiving the HTTP request and the identification information, the computer-executable instructions further cause the CDN server to:
receive the content fingerprint from the service server and the content resource; and
check whether the CDN server has stored the content fingerprint.

19. The computer program product of claim 17, wherein before receiving the HTTP request and the identification information of the user terminal, the computer-executable instructions further cause the CDN server to:
receive the content fingerprint from the service server and the content resource; and
save the content resource.

20. The computer program product of claim 17, wherein after sending the content resource to the user terminal, the computer-executable instructions further cause the CDN server to obtain an updated content resource and an updated content fingerprint from the service server when a quantity of times the content resource is accessed in a preset period of time is not greater than a preset threshold.

* * * * *

UNITED STATES PATENT AND TRADEMARK OFFICE
CERTIFICATE OF CORRECTION

PATENT NO. : 10,693,858 B2
APPLICATION NO. : 15/824499
DATED : June 23, 2020
INVENTOR(S) : Dajun Lu and Weiming Cheng Page 1 of 1

It is certified that error appears in the above-identified patent and that said Letters Patent is hereby corrected as shown below:

Claim 1, Column 21, Line 56: "based on (CDN based)" should read "based on"

Claim 11, Column 23, Line 24: "information, wherein" should read "information of the user terminal, wherein"

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*